(12) United States Patent
Hopkins et al.

(10) Patent No.: US 10,508,525 B2
(45) Date of Patent: Dec. 17, 2019

(54) DEGRADABLE DOWNHOLE TOOLS AND\OR COMPONENTS THEREOF, METHOD OF HYDRAULIC FRACTURING USING SUCH TOOLS OR COMPONENTS, AND METHOD OF MAKING SUCH TOOLS OR COMPONENTS

(71) Applicants: Marty Hill Hopkins, Needville, TX (US); Mark Allen Freeman, Needville, TX (US); Mark T. Hopkins, Needville, TX (US)

(72) Inventors: Marty Hill Hopkins, Needville, TX (US); Mark Allen Freeman, Needville, TX (US); Mark T. Hopkins, Needville, TX (US)

(73) Assignee: Bubbletight, LLC, Needville, TX (US)

( * ) Notice: Subject to any disclaimer, the term of this patent is extended or adjusted under 35 U.S.C. 154(b) by 267 days.

(21) Appl. No.: 15/456,337

(22) Filed: Mar. 10, 2017

(65) Prior Publication Data
US 2017/0260827 A1    Sep. 14, 2017

Related U.S. Application Data

(60) Provisional application No. 62/306,621, filed on Mar. 10, 2016.

(51) Int. Cl.
*E21B 43/26*    (2006.01)
*B24B 37/025*   (2012.01)

(52) U.S. Cl.
CPC ............ *E21B 43/26* (2013.01); *B24B 37/025* (2013.01)

(58) Field of Classification Search
CPC .............................. E21B 43/26; B24B 37/025
See application file for complete search history.

(56) References Cited

U.S. PATENT DOCUMENTS

| | | | |
|---|---|---|---|
| 6,293,517 B1 * | 9/2001 | Cunningham | F16K 5/202 166/330 |
| 6,380,138 B1 * | 4/2002 | Ischy | E21B 33/138 166/283 |
| 7,273,409 B2 * | 9/2007 | Hoffman | B24B 11/02 451/113 |
| 7,722,440 B2 * | 5/2010 | Potzsch | B24B 11/06 451/259 |
| 8,211,247 B2 | 7/2012 | Marya et al. | |
| 8,220,554 B2 | 7/2012 | Jordan et al. | |
| 8,342,094 B2 | 1/2013 | Marya et al. | |
| 8,485,265 B2 | 7/2013 | Marya et al. | |
| 8,535,604 B1 | 9/2013 | Baker et al. | |
| 8,663,401 B2 | 3/2014 | Marya et al. | |

(Continued)

FOREIGN PATENT DOCUMENTS

WO    2012097235 A1    7/2012

*Primary Examiner* — Michael R Wills, III
(74) *Attorney, Agent, or Firm* — Alberto Q. Amatong, Jr.; Amatong McCoy LLC

(57) ABSTRACT

A downhole tool or component, such as a hydraulic fracturing ball, may have a base body having an outer surface. The outer surface of the base body may have a lapped coating thereon. The downhole tool or component may be made by lapping the outer surface of the base body with a lapping slurry. The downhole tool or component may be used in downhole applications, such as hydraulic fracturing, and may resist degradation upon exposure to fluids, such as production fluids.

39 Claims, 7 Drawing Sheets

(56) References Cited

U.S. PATENT DOCUMENTS

| | | | |
|---|---|---|---|
| 8,677,903 B2 | 3/2014 | Marya et al. | |
| 8,770,261 B2 | 7/2014 | Marya | |
| 9,068,429 B2 | 6/2015 | Mailand et al. | |
| 9,089,947 B2* | 7/2015 | Tanaka | B24B 11/06 |
| 9,109,429 B2 | 8/2015 | Xu et al. | |
| 9,528,343 B2 | 12/2016 | Jordan et al. | |
| 2003/0019106 A1* | 1/2003 | Pope | A61L 27/04 |
| | | | 29/898 |
| 2007/0046120 A1* | 3/2007 | Cooley | E21B 4/003 |
| | | | 310/90.5 |
| 2010/0294510 A1 | 11/2010 | Holmes | |
| 2011/0135953 A1 | 6/2011 | Xu et al. | |
| 2012/0103135 A1 | 5/2012 | Xu et al. | |
| 2013/0016935 A1* | 1/2013 | Cooley | E21B 4/003 |
| | | | 384/420 |
| 2014/0190685 A1 | 7/2014 | Frazier et al. | |
| 2014/0202708 A1 | 7/2014 | Jacob et al. | |
| 2014/0251641 A1 | 9/2014 | Marya et al. | |
| 2014/0262327 A1* | 9/2014 | Xu | B22F 1/025 |
| | | | 166/376 |
| 2014/0286810 A1 | 9/2014 | Marya | |
| 2014/0363693 A1 | 12/2014 | Tamiya | |
| 2016/0137556 A1* | 5/2016 | Yamaguti | C04B 35/593 |
| | | | 501/89 |
| 2016/0376709 A1* | 12/2016 | Galos | C25D 5/02 |
| | | | 428/457 |

\* cited by examiner

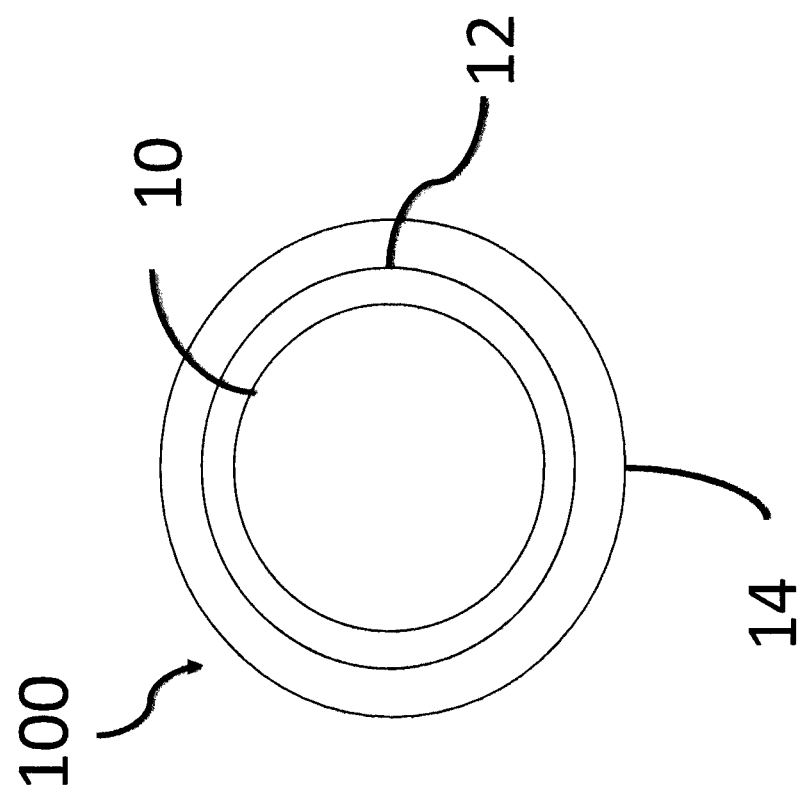

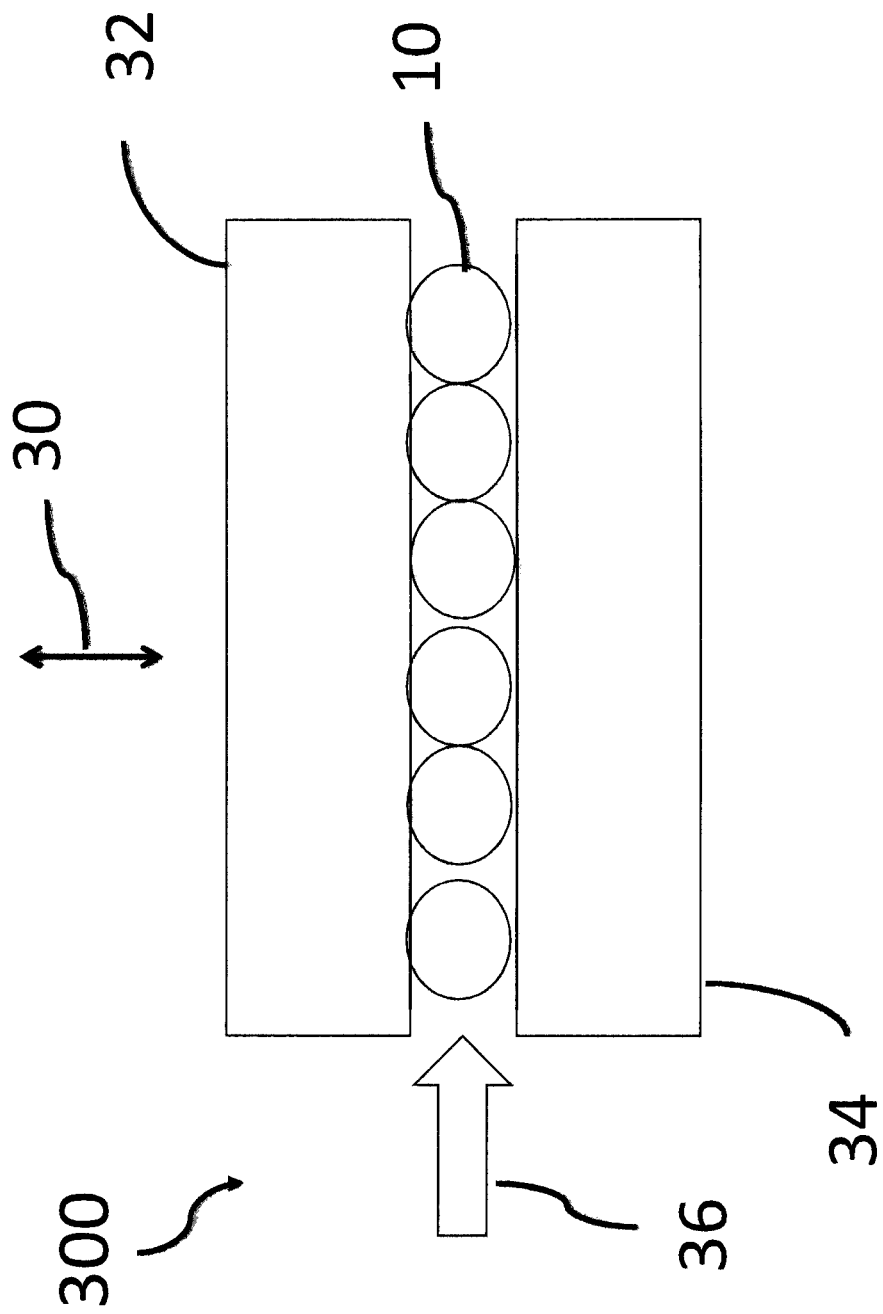

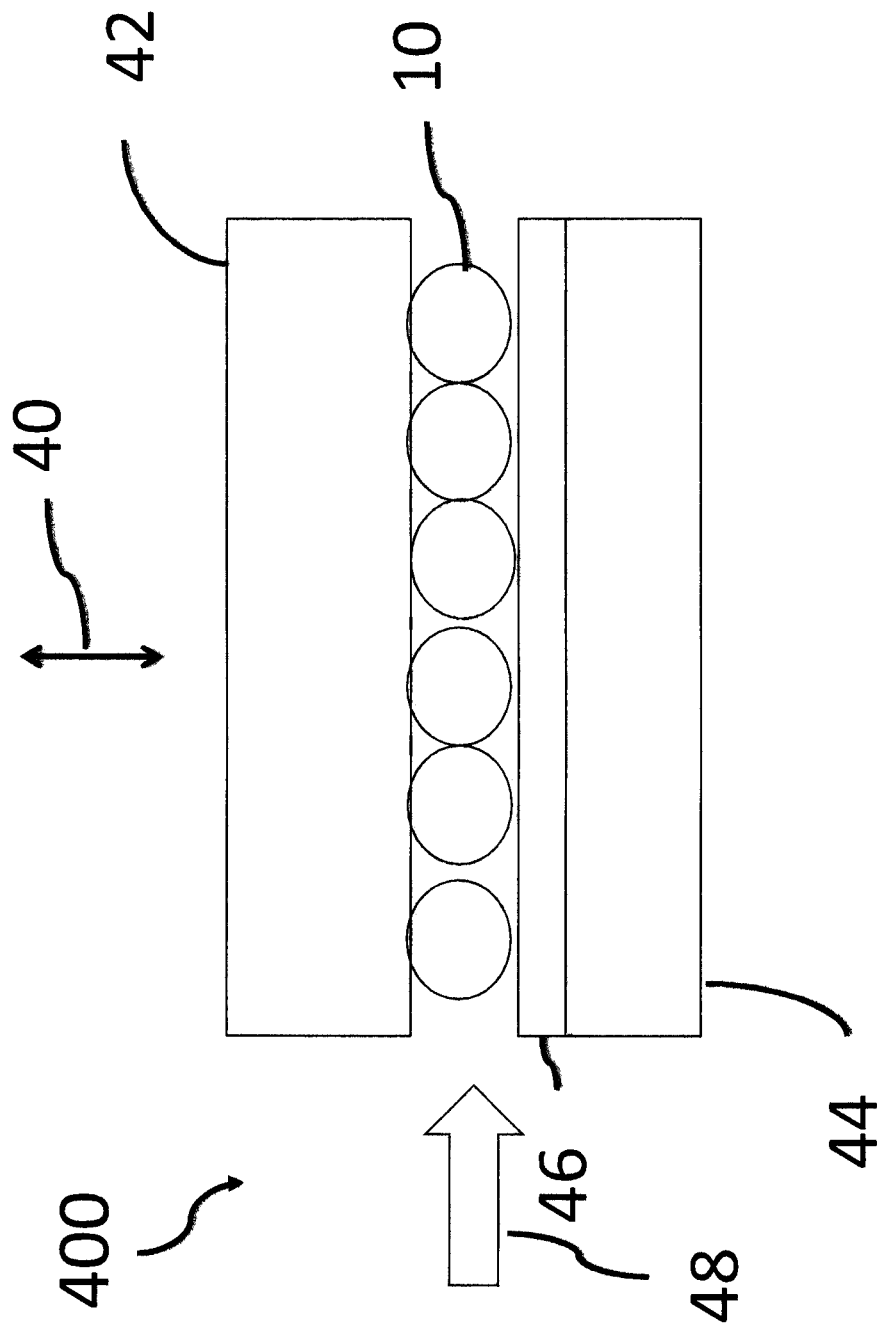

FIG. 5

- incorporating a lapped hydraulic fracturing ball into a hydraulic fracturing fluid
- pumping the hydraulic fracturing fluid containing the lapped hydraulic fracturing ball into a subterranean wellbore
- selectively controlling a thickness of the lapped coating to provide a desired amount of protection from degradation
- painting and/or wax coating the lapped tool or component

DEGRADABLE DOWNHOLE TOOLS AND\OR COMPONENTS THEREOF, METHOD OF HYDRAULIC FRACTURING USING SUCH TOOLS OR COMPONENTS, AND METHOD OF MAKING SUCH TOOLS OR COMPONENTS

CROSS-REFERENCE TO RELATED APPLICATIONS

This application claims the benefit of U.S. Provisional Patent Application Ser. No. 62/306,621, filed on Mar. 10, 2016 (pending), the entirety of which is incorporated herein by reference for all purposes and made a part of the present disclosure.

FIELD

This application relates to the field of degradable downhole tools and equipment, methods of manufacturing such tools and equipment, and methods of using such tools and equipment. More particularly, the application relates to tools and equipment manufactured, at least partially, from degradable materials, such as polymers, that are useable in downhole operations.

BACKGROUND

Recent advancements in hydrocarbon recovery techniques have enabled the production of hydrocarbons from reservoirs that could not be produced economically without the use of such techniques. In particular, hydraulic fracturing (or "fracking") involves the injection of a high-pressure fluid (primarily water, proppants, and other job-specific compounds) to fracture a portion of a hydrocarbon-containing formation such that the desired hydrocarbons may be more easily recovered. Typically, multiple zones of a formation are independently isolated and fractured.

U.S. Pat. No. 8,535,604 (the '604 patent) is hereby incorporated by reference, in its entirety, for all purposes, and is made a part of the present disclosure. The '604 patent discloses a powder metal compact and method of making the compact that can serve as a base material or body for making a tool or component, such as a fracturing ball, according to embodiments of the present disclosure. In particular, the powder metal compact may be prepared into a metal fracturing body, such as a ball, that may then be treated to make an improved hydraulic fracturing ball according to embodiments of the present disclosure.

BRIEF DESCRIPTION OF THE DRAWINGS

So that the manner in which the features and advantages of embodiments of the present disclosure may be understood in more detail, a more particular description of the briefly summarized embodiments above may be had by reference to the embodiments which are illustrated in the appended drawings that form a part of this specification. It is to be noted, however, that the drawings illustrate only various exemplary embodiments, and are therefore not to be considered limiting of the scope of this disclosure, as it may include other effective embodiments as well.

FIG. 1D depicts the lapped hydraulic fracturing ball of FIG. 1B, after having an additional coating applied thereto.

FIG. 2 depicts a first lapping apparatus in accordance with certain embodiments of the present disclosure.

FIG. 3 depicts a second lapping apparatus in accordance with certain embodiments of the present disclosure.

FIG. 5 is a flow chart of a method of using a lapped hydraulic fracturing ball in accordance with certain embodiments of the present disclosure.

DETAILED DESCRIPTION

Embodiments of the present disclosure will now be described more fully with reference to the accompanying drawings, which illustrate various exemplary embodiments. The disclosed concepts may, however, be embodied in many different forms and should not be construed as being limited by the illustrated embodiments set forth herein. Rather, these embodiments are provided so that this disclosure will be thorough as well as complete and will fully convey the scope to those skilled in the art and the best and preferred modes of practicing the embodiments. For example, many of the exemplary descriptions provided herein are concerned with hydraulic fracturing balls for use in downhole applications. Aspects of the disclosure described may, however, be equally applicable to designs for and the manufacture of other tools or components, and may be equally applicable to use that are not downhole applications.

The present disclosure generally relates to degradable, dissolvable, and/or disintegrable downhole tools (e.g., frac balls), the making of the same, and the use of the same in downhole applications (e.g., hydraulic fracturing). For example, the "Background" section of U.S. patent application Ser. No. 14/132,608 discusses such degradable tools and the use thereof in hydraulic fracturing applications. In some embodiments, the lapped tool or component described herein may be used in fracking applications as described in U.S. patent application Ser. No. 14/132,608, the entirety of which is incorporated herein by reference. In some embodiments, the lapped tool or component described herein may be used in fracking applications as described in PCT/US2012/021219, the entirety of which is incorporated herein by reference. In some embodiments, lapped tool or component described herein may be used as a ball sealer in accordance with the method described in U.S. Pat. No. 9,528,343, the entirety of which is incorporated herein by reference. In some embodiments, the base body disclosed herein may be made of the materials disclosed as suitable for use in making downhole tools and/or components, as disclosed in U.S. patent application Ser. No. 14/132,608, PCT/US2012/021219, U.S. Pat. No. 9,528,343, or U.S. Pat. No. 8,535,604.

Figure 1B:
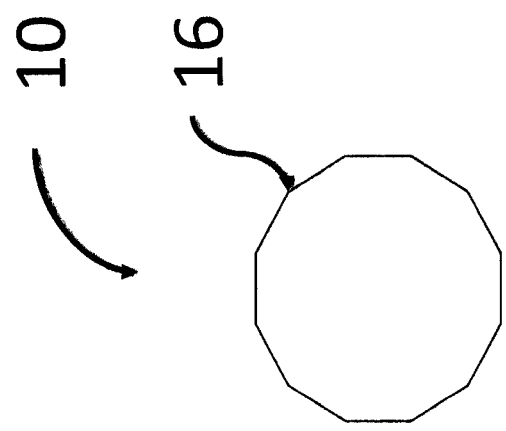
FIG. 1B depicts a hydraulic fracturing ball machined from the billet of FIG. 1A.
Figure 1A:
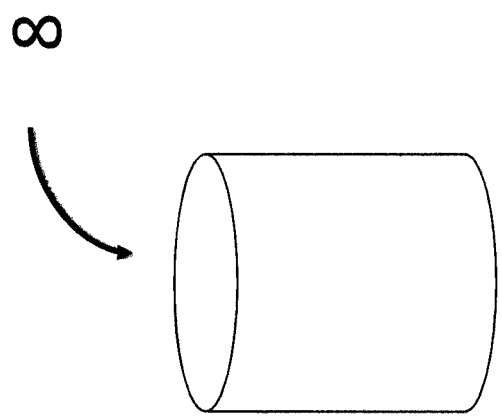
FIG. 1A depicts a billet prior to machining.

Certain embodiments of the present disclosure relate to a lapped tool or component for use in downhole applications. With reference to FIGS. 1A and 1B, tool or component 10, here shown as a hydraulic fracturing ball, may be lapped, forming lapped tool or component 100, here shown as a lapped hydraulic fracturing ball. While shown and described herein as a lapped hydraulic fracturing ball, lapped tool or component 100 may be any other tool or component used in downhole fracturing applications and subject to exposure to downhole production fluids, such as a frac plug.

To form lapped tool or component 100, tool or component 10 may be lapped, such as with a lapping slurry. Lapping, a machining process, involves contact between an abrasive surface and the surface of tool or component 10, such as via hand movement or using a machine (e.g., a lapping machine), which may result in a polishing of the surface of tool or component 10. In some embodiments, tool or component 10 may include one or more surface imperfections 16, such as peaks and/or valleys. Lapping of tool or component 10 may remove at least some of surface imperfections 16, such as by smoothing the imperfections on the surface of tool or component 10. In some embodiments, surface imperfections may include machine tool marks, such as machine tool marks that are residual from machining during formation of tool or component 10.

Figure 1C:
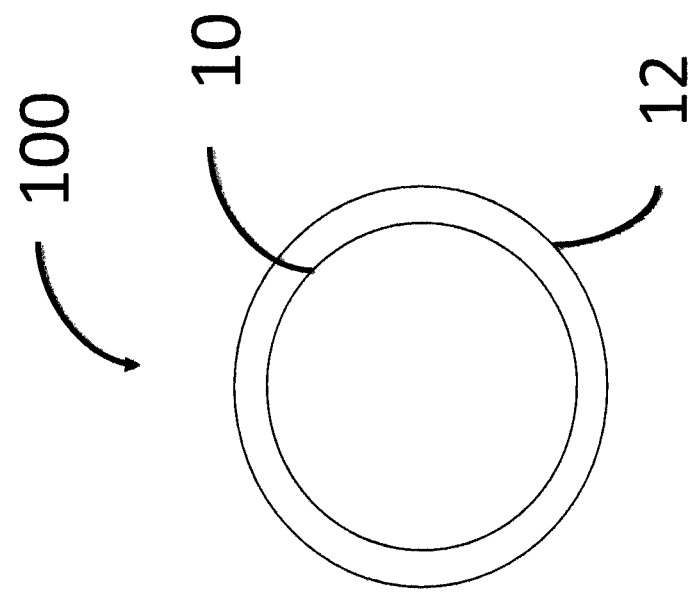
FIG. 1C depicts the hydraulic fracturing ball of FIG. 1B, after lapping.

In some embodiments, a billet of the material that the tool or component 10 is formed of may be machined to form the tool or component 10, prior to lapping. With reference to FIG. 1A, billet 8 may be machined to have the desired shape and/or dimensions, forming tool or component 10 (shown in FIG. 1B). Machining may be performed by methods well known to those of ordinary skill in the art, such as with a CNC lathe. Once machined, tool or component 10 may be lapped to form lapped tool or component 100, as shown in FIG. 1C. Lapped tool or component 100 may optionally have one or more additional coatings applied thereto, as shown in FIG. 1D and described in more detail below.

In some embodiments, the lapping slurry may be a slurry containing aluminum oxide, silica, silicone, silicone rubber, diamond paste, or combinations thereof. In certain embodiments, lapping results in at least a portion of the lapping slurry being coated on tool or component 10, shown as lapped coating 12 in FIG. 1B. In some embodiments, at least a portion of the lapping slurry at least partially impregnates and/or coats the pores, voids, and/or surface imperfections of tool or component 10. Lapped coating 12 may be at least partially embedded into tool or component 10; thereby proving a solid-state coating that may completely cover tool or component 10. Lapped coating 12 impregnate and/or coat an entirety of the outer surface of tool or component 10. In some embodiments, lapped coating 12 impregnates and/or coats less than an entirety of the outer surface of tool or component 10. Lapped coating 12 may reduce the amount of surface area of tool or component 10 that is exposed to corrosive fluids (e.g., water, acids) in a surrounding environment of tool or component 10, such as production fluid in a downhole environment or humidity (e.g., during storage of tool or component 10 prior to use downhole).

Lapped coating 12 may function as an insulator against degradation (e.g., corrosion) of tool or component 10. For example, lapped coating 12 may insulate tool or component 10 from galvanic degradation of tool or component 10 (e.g., a metal fracturing ball or tool), such as when lapped tool or component 100 is in contact with a hydraulic fracturing fluid, which may contain water, HCl, or KCl.

With reference to FIG. 2, lapping may be performed using first lapping apparatus 300, and may include placing one or more tools or components 10 between first plate 32 and second plate 34. First and second plates 32 and 34 may be metal plates, for example. Second plate 34 may be static, and first plate 32 may be configured to rotate about rotational axis 32. For example, first plate 32 may be driven by a V-belt coupled with a motor. First lapping slurry 36 may be injected into first lapping apparatus 300 between first plate 32 and second plate 34. First lapping slurry 36 may contain aluminum oxide in a slurry with water, oil, or combinations thereof. Aluminum oxide suitable for use in this disclosure may include, but is not limited to, aluminum oxide having a mesh size of about 1 to about 50, or about 2 to about 40, or about 3 to about 30, or about 5 to about 20, or about 10 to about 15. Rotation of first plate 32 may cause rolling of tools or components 10 between first plate 32 and second plate 34. Aluminum oxide within first lapping slurry 36 may grind the outer surface of tools or components 10; thereby increasing the smoothness of the outer surface of tools or components 10. For example and without limitation, prior to lapping with first lapping slurry 36, tools or components 10 may have a root mean square (RMS) finish of greater than 100, greater than 150, greater than 200, greater than 250, greater than 270, or from 150 to 300. After lapping with first lapping slurry 36, tools or components 10 may have an RMS finish of less than 270, or less than 150, or less than 100, or less than 95, or from 50 to about 99, or from about 60 to about 95, or from about 70 to 90, or from about 80 to 90. During lapping with first lapping slurry 36, aluminum oxide particles and/or slurry may be transferred onto the outer surface of tools or components 10, forming at least a portion of lapped coating 12 thereon.

With reference to FIG. 3, after lapping is performed using first lapping apparatus 300, further lapping may be performed in second lapping apparatus 400. The one or more tools or components 10, after lapping in the first lapping apparatus 300, may be placed between mesh or felt member 42 and third plate 44. Third plate 44 may be a metal plate, for example. Third plate 44 may have a layer of silicone rubber 46 thereon, such that tools or components 10 are located between felt or mesh member 42 and the silicone rubber layer 46. Third plate 44 and silicone rubber layer 46 may be static, and mesh or felt member 42 may be configured to move (e.g., rotate about rotational axis 40). Second lapping slurry 48 may be injected into second lapping apparatus 400 between mesh or felt member 42 and silicone rubber layer 46. In some embodiments, second lapping slurry 48 is applied to mesh or felt member 42. Second lapping slurry 48 may by a diamond paste or slurry containing diamond particles mixed with water, oil, or combinations thereof. The diamond particles may have a particle size ranging from about 10 to about 10 microns, or from about 2 to about 5 microns, or about 3 microns. Movement of mesh or felt member 42 relative to third plate 44 may cause rolling of tools or components 10 between mesh or felt member 42 and third plate 44. Diamond particles within second lapping slurry 48 may grind the outer surface of tools or components 10; thereby increasing the smoothness of the outer surface of tools or components 10. For example and without limitation, after lapping with second lapping slurry 48, tools or components 10 may have an RMS finish of less than 50, or less than 40, or less than 30, or less than 20, or from 5 to about 18, or from about 5 to about 15, or from about 10 to 12. During lapping with second lapping slurry 48, diamond paste or slurry and/or diamond particles may be transferred onto the outer surface of tools or components 10, forming at least a portion of lapped coating 12 thereon. Additionally, during lapping with second lapping slurry 48, at least some silica and/or silicone rubber may be transferred onto the outer surface of tools or components 10, forming at least a portion of lapped coating 12 thereon.

In some embodiments of the present disclosure, lapping is performed without use of grinding wheels.

While tool or component 10 may be painted and/or coated with wax to at least partially prevent degradation of tool or component 10 while tool or component 10 is resting in the launcher of tool or component 10, without lapped coating 12 such paint or wax coatings will flake off as tool or component 10 is pumped downhole to the seat of the tool or component 10. In some embodiments, lapped coating 12 may coat and/or impregnate tool or component 10 in a manner that does not flake off (e.g., when tool or component 10 is pumped downhole to the seat). In some embodiments, as shown in FIG. 2, lapped tool or component 100 may include the base body, tool or component 10, lapped coating 12 coated onto the outer surface of tool or component 10, and pain and/or wax coating 14 coated overlapped coating 12.

In some embodiments, tool or component 10 is a hydraulic fracturing ball, which may be spherical or generally spherical. Tool or component 10 may be formed by providing a base body, and machining the base body into a desired shape (e.g., spherical ball) of a tool body. Tool or component 10 may be made of metal, a metal matrix composite material, or a degradable (e.g., dissolvable) polymer. The degradable polymer may be, for example and without limitation, a water-soluble polymer or gel such as polyvinyls, polyacrylics, polyhydroxyacids, and the like, and combinations thereof. The metal matrix composite material may include particulates, such as micro-engineered particulates consolidated through controlled solid-state. In some embodiments, at least one coating may encapsulate the particulates. The metal matrix composite material may include a powder substrate. The powder substrate may contain one or more metals, alloys, elements, polymers, ceramics, or combinations thereof. In some embodiments, the metal matrix composite material contains consolidated coated particle cores. The coated particle cores may contain magnesium. The coated particles cores may have one or a plurality of coatings encapsulating the particle cores. In some embodiments, the coatings on the coated particles cores may include an aluminum coating, an aluminum oxide coating, a tungsten coating, or combinations thereof.

Lapped tool or component 100 may exhibit a longer shelf-life in comparison to a conventional, non-lapped tool or component. For example, lapped coating 12 may protect lapped tool or component 100 from degradation (e.g., corrosion) due to environmental exposure, such as humidity (e.g., in very humid climates). Humidity may degrade unlapped tools or components.

During use of lapped tool or component 100, lapped coating 12 may slow or retard initial degradation of lapped tool or component 100, such as during exposure of lapped tool or component 100 to water-based production fluids and/or when lapped tool or component 100 is used in a ball-launcher.

In some embodiments, degradation of lapped tool or component 100 is an at least two stage process. A first stage of degradation occurs, followed by a second stage of degradation. The first stage of degradation may be occur at a slower rate than the second stage of degradation. The first, slower stage of degradation may protect the base body 10 from corrosion during a time frame that is sufficient to allow lapped tool or component 100 (lapped hydraulic fracturing ball) to reside within production fluid in a ball launcher before deployment, such as a time period of from 1 to 24 hours, or 2 to 12 hours, or 5 to 8 hours, or 2 to 3 hours. In operation, it is desirable that lapped tool or component 100 (lapped hydraulic fracturing ball) is fully intact when first seated on the seat of the fracturing sleeve, otherwise the lapped hydraulic fracturing ball may be unable to withstand the fracturing pressure without failing. In some embodiments, the first stage involves degradation of lapped coating 12, and the second stage involves degradation of a remainder of the lapped tool or component 100. Lapped coating 12 may have a thickness sufficient to withstand degradation during storage (e.g., resisting degradation caused by humidity). In some embodiments, lapped coating 12 may be configured to resist degradation until certain conditions occur, such as until a certain fracking stage occurs, or until the surrounding environment attains certain salinity conditions, temperature conditions, pressure conditions, or the like. As such, lapped tool or component 100 may be designed to dissolve or otherwise degrade at a selected time during the particular downhole application.

In some embodiments, a thickness of lapped coating 12 may be selectively controlled to provide a desired amount of protection from degradation. The ability to control the thickness of lapped coating 12 in conjunction with the two-stage degradation of lapped tool or component 100 may allow for a timed-released exposure of base body 10, beneath lapped coating 12, to exposure to degradation (e.g., exposure to production fluids).

Lapped tool or component 100 may exhibit increased sphericity relative to the sphericity of tool or component 10 prior to lapping. For example, lapped tool or component 100 may exhibit a sphericity ranging from 0.95 to 1, from 0.96 to 1, from 0.97 to 1, from 0.98 to 1, from 0.99 to 1, from 0.999 to 1. In some embodiments, lapped tool or component 100 has a sphericity of 0.95 or about 0.95, or 0.96 or about 0.96, or 0.97 or about 0.97, 0.98 or about 0.98, 0.99 or about 0.99, or of 0.999 or about 0.999, or 1 or about 1. As would be understood by one of ordinary skill in the art, sphericity is the measure of how closely a shape approaches that of a mathematically perfect sphere. Mathematically, sphericity is defined as the ratio of the surface area of a sphere (with the same volume as a given object) to the surface area of the given object. A perfect sphericity of 1, and all other shapes have a sphericity of less than 1.

In some embodiments, lapped tool or component 100 may have a tolerance of less than five thousandths of an inch, or less than four thousandths of an inch, or within or less than three thousandths of an inch. For example, a ball shaped lapped tool or component 100 having a target, desired diameter of 1 inch, may have an actual diameter that is within plus and/or minus five thousandths of an inch of the target, desired diameter, or is within plus and/or minus four thousandths of an inch of the target, desired diameter, or is within plus and/or minus 3 thousandths of an inch of the target, desired diameter.

In certain embodiments, the lapped tool or component 100 is a dissolvable or otherwise degradable tool or component configured for use in downhole environments. The dissolvable or otherwise degradable, lapped tool or component 100 may be adapted to selectively dissolve or degrade under certain conditions.

Certain embodiments relate to a method of making a lapped tool or component. The method of making a lapped tool or component may be used to make lapped tool or components 100, as shown in FIGS. 1C and 1D, or any embodiment of lapped tool or component described herein. In some embodiments, the first lapping apparatus 300 and second lapping apparatus 400 may be used to perform one or more steps of the method of making a lapped tool or component.

Figure 4:
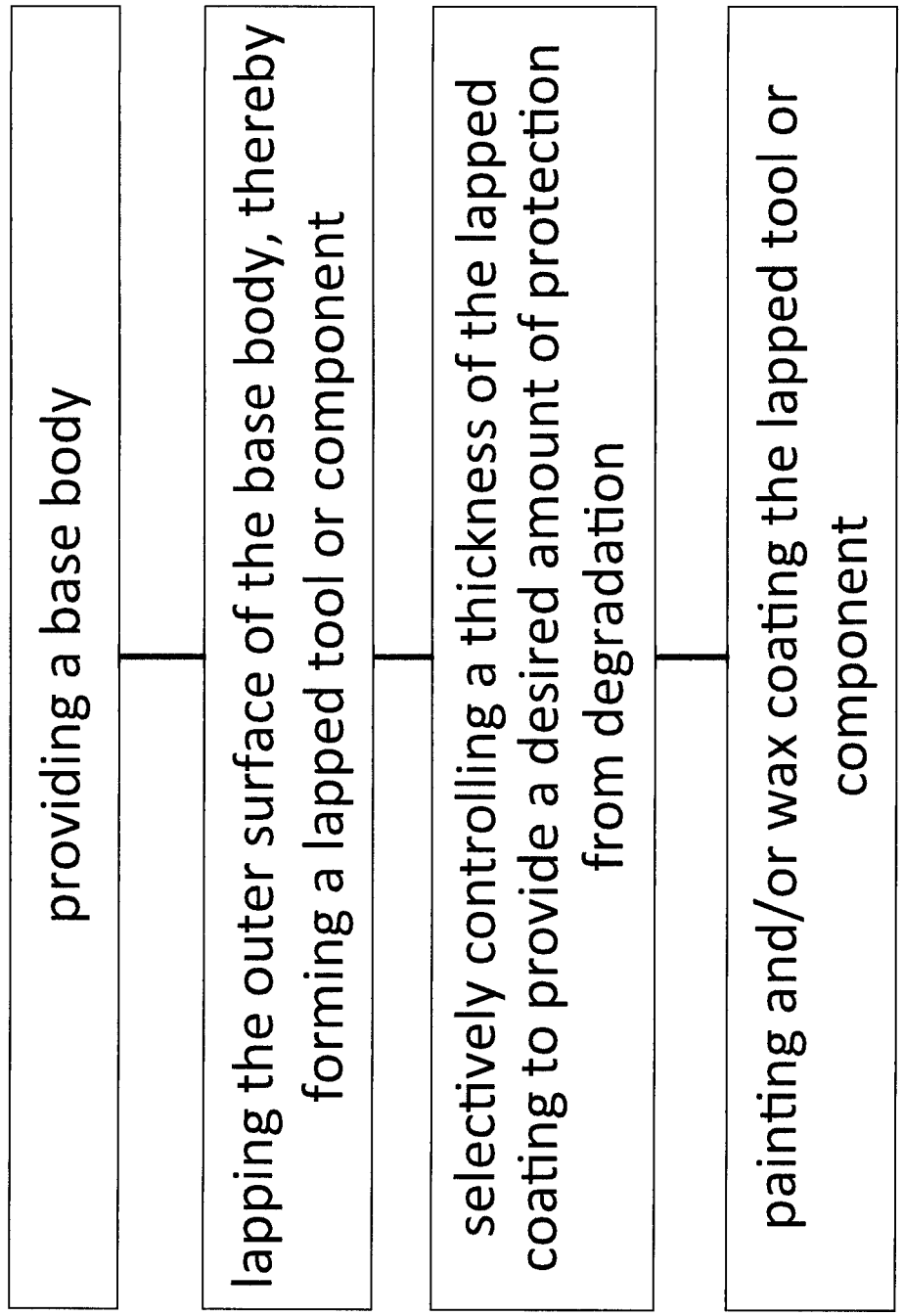
FIG. 4 is a flow chart of a method of making a lapped hydraulic fracturing ball in accordance with certain embodiments of the present disclosure.

With reference to FIG. 4, the method may include providing a base body, 300. In some embodiments, the providing the base body includes machining a billet to the desired shape and/or outer surface. The desired shape may be that of a ball, for example, and the outer surface may be a generally spherical outer surface. The machining of the base body may form machining marks on the outer surface of the base body.

The method may include lapping the outer surface of the base body, thereby forming a lapped tool or component, 302.

As described herein, the lapping may include lapping with aluminum oxide ($Al_2O_3$), silica ($SiO_2$), silicone rubber, diamond paste containing diamond particles, silicone (polysiloxanes), or combinations thereof. The lapping may reduce peak and valley surface imperfections on the outer surface of the base body. The lapping may impregnate surface imperfections on the outer surface of the base body; thereby reducing the exposed surface area of the base body of the lapped tool or component. The lapping may remove at least some of the machining marks on the outer surface of the base body. The lapping may also reduce or eliminate exposed surface of the base body of the lapped tool or component. The lapping may be performed as described elsewhere herein, such as the in accordance with the discussion provided with respect to FIGS. 2 and 3.

In some embodiments, the method may include selectively controlling a thickness of the lapped coating to provide a desired amount of protection from degradation, 304.

In some embodiment, the method may include painting and/or wax coating the lapped tool or component, 306. In other embodiments, the lapped tool or component is not painted and/or wax coated.

Certain embodiments of the present disclosure relate to a method of using a lapped tool or component in a downhole application, such as a hydraulic fracturing method using a lapped tool or component in accordance with the present disclosure.

The method may include providing the lapped tool or component in a downhole environment, wherein the lapped tool or component is exposed to fluids, such as production fluids and/or fracturing fluids. For example, with reference to FIG. 4, the method may include incorporating a lapped hydraulic fracturing ball into a hydraulic fracturing fluid, 400. For example, a ball launcher may be used to inject lapped hydraulic fracturing balls into the hydraulic fracturing fluid as the hydraulic fracturing fluid is pumped. The hydraulic fracturing fluid may contain primarily water, proppants, and other job-specific compounds, for example.

The method may include pumping the hydraulic fracturing fluid containing the lapped hydraulic fracturing ball into a subterranean wellbore, 402. The hydraulic fracturing fluid may be pumped under pressure sufficient to breakdown portions of a geological formation surrounding the wellbore and to propagate a fracture network within the geological formation. As would be understood by one of ordinary skill in the art, the lapped hydraulic fracturing balls within the hydraulic fracturing fluid function as ball sealers to seal perforations and divert fluids to desired locations. In some embodiments, the subterranean wellbore intersects at least a portion of a hydrocarbon-containing formation containing desired hydrocarbons (e.g., oil or natural gas).

In some embodiments, the method includes fracking multiple zones of a wellbore, as described at least in the Background section of U.S. Pat. Ser. No. 14/132,608.

Table 1 lists examples of material suitable for use in production of the lapped tools or components disclosed herein. Any one or more of the materials listed as suitable for the base body material, which may be coated with a lapped coating made of any one or more of the materials listed as suitable for the lapped coating, which may be further coated with any one or more of the materials listed as suitable for the additional coating.

TABLE 1

| | Materials | | |
|---|---|---|---|
| | Base body material | Lapped coating material | Additional Coating |
| 1 | Metal | Aluminum oxide | Wax |
| 2 | Degradable Polymer | Diamond Particles | Paint |
| 3 | Metal matrix composite material | Silicone and/or Silica and/or Silicone Rubber | |

The foregoing description has been presented for purposes of illustration and description of preferred embodiments. This description is not intended to limit associated concepts to the various systems, apparatus, structures, and methods specifically described herein. For example, systems and methods described in the context of a degradable fracturing ball, may be applicable to other tools employed downhole during fracturing. The embodiments described and illustrated herein are further intended to explain the best and preferred modes for practicing the system and methods, and to enable others skilled in the art to utilize same and other embodiments and with various modifications required by the particular applications or uses.

What is claimed is:

1. A downhole tool or component comprising:
a base body having an outer surface, wherein the outer surface of the base body is lapped, wherein a lapped coating is on the outer surface of the base body.

2. The downhole tool or component of claim 1, wherein the lapped coating comprises aluminum oxide, silica, silicone, silicone rubber, diamond particles, or combinations thereof.

3. The downhole tool or component of claim 1, wherein at least a portion of the lapped coating at least partially impregnates pores, voids, other surface imperfections, or combinations thereof on the outer surface of the base body.

4. The downhole tool or component of claim 1, wherein the lapped coating is at least partially embedded into the outer surface of the base body.

5. The downhole tool or component of claim 1, wherein the lapped coating is a solid-state coating.

6. The downhole tool or component of claim 1, wherein the lapped coating reduces the amount of surface area of the base body that is exposed to corrosive fluids in a surrounding environment of the downhole tool or component.

7. The downhole tool or component of claim 1, wherein the lapped coating is an insulator coating that protects the base body against degradation.

8. The downhole tool or component of claim 1, further comprising a paint coating, wax coating, or combinations thereof coated over the lapped coating.

9. The downhole tool or component of claim 1, wherein the lapped coating does not flake off of the base body when the downhole tool or component is exposed to fluid.

10. The downhole tool or component of claim 1, wherein the base body comprises metal.

11. The downhole tool or component of claim 1, wherein the base body comprises a metal matrix composite material, and wherein the metal matrix composite material comprises micro-engineered particulates consolidated through controlled solid-state.

12. The downhole tool or component of claim 1, wherein the downhole tool or component exhibits a longer shelf-life in comparison to a downhole tool or component that does not have a lapped base body.

13. The downhole tool or component of claim 1, wherein the lapped coating slows or retards initial degradation of the downhole tool or component.

14. The downhole tool or component of claim 1, wherein degradation of the downhole tool or component is an at least two stage process.

15. The downhole tool or component of claim 14, wherein the first stage of degradation occurs at a slower rate than the second stage of degradation.

16. The downhole tool or component of claim 15, wherein the first, slower stage of degradation protects the base body from corrosion during a time frame that is sufficient to allow the downhole tool or component to reside within production fluid in a ball launcher before deployment.

17. The downhole tool or component of claim 16, wherein the time frame is from 1 to 24 hours.

18. The downhole tool or component of claim 1, wherein a thickness of the lapped coating is selectively controlled to provide a desired amount of protection to the base body from degradation.

19. The downhole tool or component of claim 1, wherein the lapped coating provides timed-released exposure of base body to degradation.

20. The downhole tool or component of claim 1, wherein the based body is lapped with a first slurry and a second slurry, and wherein the lapped downhole tool or component has a root mean square (RMS) finish of less than 50.

21. The downhole tool or component of claim 1, wherein the lapped downhole tool or component exhibits increased sphericity relative to the sphericity of an otherwise identical tool or component that is not lapped.

22. The downhole tool or component of claim 1, wherein the lapped downhole tool or component exhibits a sphericity ranging from 0.95 to about 1.

23. The downhole tool or component of claim 1, wherein the lapped downhole tool or component has a tolerance of less than five thousandths of an inch.

24. The downhole tool or component of claim 1, wherein the base body comprises a degradable polymer.

25. A downhole tool or component comprising:
a base body having an outer surface, wherein the outer surface of the base body is lapped, wherein the downhole tool or component is a hydraulic fracturing ball or a frac plug.

26. A method of making a lapped tool or component, the method comprising:
providing a base body; and
lapping an outer surface of the base body with at least one lapping slurry, thereby forming the lapped tool or component;
wherein the at least one lapping slurry is coated on at least a portion of the lapped tool or component.

27. The method of claim 26, wherein providing the base body comprises machining a billet to have a desired shape and outer surface, forming the base body.

28. The method of claim 26, wherein the at least one lapping slurry comprises aluminum oxide, silica, silicone, silicone rubber, diamond particles, or combinations thereof.

29. The method of claim 26, wherein the lapping reduces peak and valley surface imperfections on the outer surface of the base body, impregnates the outer surface of the base body with the at least one lapping slurry, reduces exposed surface area of the base body, removes at least some machining marks on the outer surface of the base body, or combinations thereof.

30. The method of claim 26, further comprising coating the lapped tool or component with paint, wax, or combinations thereof.

31. The method of claim 26, wherein the at least one lapping slurry includes a slurry comprising aluminum oxide, a slurry comprising diamond particles, or combinations thereof.

32. The method of claim 26, wherein the at least one lapping slurry comprises a first lapping slurry, and wherein lapping the outer surface of the base body comprises:
placing the base body between a first plate and a second plate of a first lapping machine;
injecting the first lapping slurry comprising aluminum oxide between the first plate and the second plate; and
moving the first plate relative to the second plate, thereby moving the base body, wherein during the lapping with first lapping slurry, at least a portion of the aluminum oxide is transferred onto the outer surface of the base body, forming at least a portion of a lapped coating thereon.

33. The method of claim 32, wherein the at least one lapping slurry further comprises a diamond paste or slurry, the method further comprising:
after lapping the base body in the first lapping apparatus, placing the base body between a mesh or felt member and a third plate of a second lapping apparatus, wherein a layer of silicone rubber is positioned on the third plate, such that the base body is located between the mesh or felt member and the layer of silicone rubber;
applying the diamond paste or slurry comprising diamond particles to the mesh or felt member, and moving the mesh or felt member relative to the third plate, thereby moving the base body between the mesh or felt member and the third plate;
wherein during lapping, at least a portion of the diamond particles and the silicone rubber are transferred onto the outer surface of base body, forming at least a portion of the lapped coating thereon.

34. The method of claim 33, wherein prior to lapping with first lapping slurry, the base body has a root mean square (RMS) finish of greater than 100, and wherein after lapping with first lapping slurry the base body has an RMS finish of less than 100 and greater than 50; and wherein after lapping with the diamond paste or slurry the base body has an RMS finish of less than 50.

35. The method of claim 26, wherein the lapped tool or component exhibits a sphericity ranging from 0.95 to 1, a tolerance of less than five thousandths of an inch, or combinations thereof.

36. A method of using a lapped tool or component in a downhole application, comprising:
providing a lapped tool or component in a downhole environment, wherein the lapped tool or component is exposed to fluid, and wherein the lapped tool or component is at least partially coated with a lapped coating.

37. The method of claim 36, wherein the method comprises hydraulically fracturing subterranean wellbore, wherein the lapped tool or component is a lapped hydraulic fracturing ball that is incorporated into a hydraulic fracturing fluid.

38. The method of claim 36, wherein the lapped tool or component has a sphericity ranging from 0.95 to 1, a tolerance of less than five thousandths of an inch, or combinations thereof.

39. A downhole tool or component comprising:
a base body having an outer surface, wherein the outer surface of the base body is lapped; and wherein the lapped downhole tool or component exhibits a sphericity ranging from 0.95 to about 1, a tolerance of less than five thousandths of an inch, or combinations thereof.

* * * * *